US008731379B1

(12) United States Patent
Craner

(10) Patent No.: US 8,731,379 B1
(45) Date of Patent: May 20, 2014

(54) SYSTEMS AND METHODS FOR RECORDING PROGRAMS WITH A NETWORK RECORDING DEVICE UPON FAILURE OF A USER'S EQUIPMENT

(75) Inventor: Michael L Craner, Exton, PA (US)

(73) Assignee: Rovi Guides, Inc., Santa Clara, CA (US)

( * ) Notice: Subject to any disclaimer, the term of this patent is extended or adjusted under 35 U.S.C. 154(b) by 1788 days.

(21) Appl. No.: 11/267,469

(22) Filed: Nov. 4, 2005

(51) Int. Cl.
*H04N 5/77* (2006.01)
*H04N 5/765* (2006.01)
*H04N 5/76* (2006.01)

(52) U.S. Cl.
CPC ..................................... *H04N 5/76* (2013.01)
USPC .......................................... 386/326; 386/200

(58) Field of Classification Search
CPC .................................. H04N 5/76; H04N 5/90
USPC ........................................................ 386/46
See application file for complete search history.

(56) References Cited

U.S. PATENT DOCUMENTS

| | | | |
|---|---|---|---|
| 4,355,415 A | 10/1982 | George et al. | |
| 4,605,964 A | 8/1986 | Chard | |
| 4,694,490 A | 9/1987 | Harvey et al. | |
| 4,706,121 A | 11/1987 | Young | |
| 4,718,107 A | 1/1988 | Hayes | |
| 4,847,698 A | 7/1989 | Freeman | |
| 4,857,999 A | 8/1989 | Welsh | |
| 4,908,707 A | 3/1990 | Kinghorn | |
| 4,930,158 A | 5/1990 | Vogel | |
| 4,959,720 A | 9/1990 | Duffield et al. | |
| 4,977,455 A | 12/1990 | Young | |
| 5,047,867 A | 9/1991 | Strubbe et al. | |
| 5,109,279 A | 4/1992 | Ando | |
| 5,134,719 A | 7/1992 | Mankovitz | |
| 5,151,789 A | 9/1992 | Young | |
| 5,172,413 A | 12/1992 | Bradley et al. | |
| 5,200,822 A | 4/1993 | Bronfin et al. | |
| 5,223,924 A | 6/1993 | Strubbe | |
| 5,253,066 A | 10/1993 | Vogel | |

(Continued)

FOREIGN PATENT DOCUMENTS

| | | |
|---|---|---|
| EP | 0424469 | 5/1991 |
| EP | 0753964 | 1/1997 |

(Continued)

OTHER PUBLICATIONS

U.S. Appl. No. 09/974,471, filed Oct. 9, 2001, Thomas et al.

(Continued)

*Primary Examiner* — William C Vaughn, Jr.
*Assistant Examiner* — Asher Khan
(74) *Attorney, Agent, or Firm* — Ropes & Gray LLP

(57) ABSTRACT

Systems and methods for performing recordings with a network recording device when a user's equipment fails are provided. The network recording device may determine that a user's equipment has failed in any suitable manner. In response to determining that the user's equipment has failed, the network recording device may perform recordings that were originally scheduled or selected to be performed with the user's equipment. The network recording device may identify which recordings to perform by communicating with the user's equipment. In some embodiments, the user's equipment may anticipate a failure, or fail while maintaining a communications link with the network recording device. In such embodiments, the user's equipment may direct the network recording device to perform certain recordings. The network recording device may provide recordings to the user's equipment as on-demand offerings, or may transfer the recordings to the user's equipment.

31 Claims, 10 Drawing Sheets

(56) References Cited

U.S. PATENT DOCUMENTS

| | | |
|---|---|---|
| 5,335,277 A | 8/1994 | Harvey et al. |
| 5,353,121 A | 10/1994 | Young et al. |
| 5,412,720 A | 5/1995 | Hoarty |
| 5,442,389 A | 8/1995 | Blahut et al. |
| 5,461,415 A | 10/1995 | Wolf et al. |
| 5,479,266 A | 12/1995 | Young et al. |
| 5,479,268 A | 12/1995 | Young et al. |
| 5,483,278 A | 1/1996 | Strubbe et al. |
| 5,485,197 A | 1/1996 | Hoarty |
| 5,488,409 A | 1/1996 | Yuen et al. |
| 5,517,257 A | 5/1996 | Dunn et al. |
| 5,523,794 A | 6/1996 | Mankovitz et al. |
| 5,523,796 A | 6/1996 | Marshall et al. |
| 5,524,195 A | 6/1996 | Clanton, III et al. |
| 5,532,754 A | 7/1996 | Young et al. |
| 5,534,911 A | 7/1996 | Levitan |
| 5,537,141 A | 7/1996 | Harper et al. |
| 5,539,449 A | 7/1996 | Blahut et al. |
| 5,541,738 A | 7/1996 | Mankovitz |
| 5,543,852 A | 8/1996 | Yuen et al. |
| 5,550,576 A | 8/1996 | Klosterman |
| 5,581,614 A | 12/1996 | Ng et al. |
| 5,583,561 A | 12/1996 | Baker et al. |
| 5,583,563 A | 12/1996 | Wanderscheid et al. |
| 5,585,838 A | 12/1996 | Lawler et al. |
| 5,585,858 A | 12/1996 | Harper et al. |
| 5,585,866 A | 12/1996 | Miller et al. |
| 5,589,892 A | 12/1996 | Knee et al. |
| 5,592,551 A | 1/1997 | Lett et al. |
| 5,602,582 A | 2/1997 | Wanderscheid et al. |
| 5,619,274 A | 4/1997 | Roop et al. |
| 5,621,579 A | 4/1997 | Yuen |
| 5,630,119 A | 5/1997 | Aristides et al. |
| 5,632,007 A | 5/1997 | Freeman |
| 5,648,824 A | 7/1997 | Dunn et al. |
| 5,652,613 A | 7/1997 | Lazarus et al. |
| 5,654,748 A | 8/1997 | Matthews, III |
| 5,654,886 A | 8/1997 | Zereski, Jr. et al. |
| 5,657,072 A | 8/1997 | Aristides et al. |
| 5,659,367 A | 8/1997 | Yuen |
| 5,666,645 A | 9/1997 | Thomas et al. |
| 5,684,525 A | 11/1997 | Klosterman |
| 5,694,163 A | 12/1997 | Harrison |
| 5,701,383 A | 12/1997 | Russo et al. |
| 5,717,452 A | 2/1998 | Janin et al. |
| 5,724,203 A | 3/1998 | Kwoh et al. |
| 5,727,060 A | 3/1998 | Young |
| 5,745,710 A | 4/1998 | Clanton, III et al. |
| 5,751,282 A | 5/1998 | Girard et al. |
| 5,752,159 A | 5/1998 | Faust et al. |
| 5,754,771 A | 5/1998 | Epperson et al. |
| 5,758,257 A | 5/1998 | Herz et al. |
| 5,760,821 A | 6/1998 | Ellis et al. |
| 5,761,607 A | 6/1998 | Gudesen |
| 5,768,528 A | 6/1998 | Stumm |
| 5,778,181 A | 7/1998 | Hidary et al. |
| 5,778,182 A | 7/1998 | Cathey et al. |
| 5,781,226 A | 7/1998 | Sheehan |
| 5,781,228 A | 7/1998 | Sposato |
| 5,790,198 A | 8/1998 | Roop et al. |
| 5,796,952 A | 8/1998 | Davis et al. |
| 5,801,787 A | 9/1998 | Schein et al. |
| 5,802,284 A | 9/1998 | Karlton et al. |
| 5,805,763 A | 9/1998 | Lawler et al. |
| 5,805,804 A | 9/1998 | Laursen et al. |
| 5,808,608 A | 9/1998 | Young et al. |
| 5,809,204 A | 9/1998 | Young et al. |
| 5,812,123 A | 9/1998 | Rowe et al. |
| 5,812,205 A | 9/1998 | Milnes et al. |
| 5,818,438 A | 10/1998 | Howe et al. |
| 5,819,019 A | 10/1998 | Nelson |
| 5,828,945 A | 10/1998 | Klosterman |
| 5,850,218 A | 12/1998 | LaJoie et al. |
| 5,909,212 A | 6/1999 | Nishina et al. |
| 5,949,954 A | 9/1999 | Young et al. |
| 5,999,688 A | 12/1999 | Iggulden et al. |
| 6,052,145 A | 4/2000 | Macrae et al. |
| 6,058,238 A | 5/2000 | Ng |
| 6,091,883 A | 7/2000 | Artigalas et al. |
| 6,091,884 A | 7/2000 | Yuen et al. |
| 6,115,057 A | 9/2000 | Kwoh et al. |
| 6,122,011 A | 9/2000 | Dias et al. |
| 6,125,231 A | 9/2000 | Yuen et al. |
| 6,147,715 A | 11/2000 | Yuen et al. |
| 6,167,188 A | 12/2000 | Young et al. |
| 6,177,931 B1 | 1/2001 | Alexander et al. |
| 6,208,335 B1 | 3/2001 | Gordon et al. |
| 6,233,389 B1 | 5/2001 | Barton et al. |
| 6,240,241 B1 | 5/2001 | Yuen |
| 6,324,338 B1 | 11/2001 | Wood et al. |
| 6,441,832 B1 | 8/2002 | Tao et al. |
| 6,473,559 B1 | 10/2002 | Knudson et al. |
| 6,498,895 B2 | 12/2002 | Young et al. |
| 6,820,278 B1 | 11/2004 | Ellis |
| 6,850,693 B2 | 2/2005 | Young et al. |
| 7,298,960 B1 * | 11/2007 | Taylor et al. .................. 386/291 |
| 2002/0059621 A1 | 5/2002 | Thomas et al. |
| 2002/0141730 A1 * | 10/2002 | Haken ............................. 386/46 |
| 2003/0140148 A1 * | 7/2003 | Kondo et al. .................. 709/228 |
| 2003/0149980 A1 | 8/2003 | Hassell et al. |
| 2003/0149988 A1 | 8/2003 | Ellis et al. |
| 2004/0008971 A1 | 1/2004 | Young et al. |
| 2004/0128686 A1 | 7/2004 | Boyer et al. |
| 2004/0181814 A1 | 9/2004 | Ellis et al. |
| 2005/0050578 A1 * | 3/2005 | Ryal ............................. 725/143 |
| 2005/0152669 A1 * | 7/2005 | Kim et al. ....................... 386/46 |
| 2010/0074600 A1 * | 3/2010 | Putterman et al. ............ 386/124 |

FOREIGN PATENT DOCUMENTS

| | | |
|---|---|---|
| EP | 0762756 | 3/1997 |
| EP | 0763938 | 3/1997 |
| EP | 0843468 | 5/1998 |
| EP | 0874524 | 10/1998 |
| EP | 0940985 | 9/1999 |
| JP | 10-042242 | 2/1998 |
| JP | 10-112087 | 4/1998 |
| JP | 10-164487 | 6/1998 |
| WO | WO 88/04507 | 6/1988 |
| WO | WO 90/00847 | 1/1990 |
| WO | WO 91/00670 | 1/1991 |
| WO | WO 91/07050 | 5/1991 |
| WO | WO 92/04801 | 3/1992 |
| WO | WO 92/22983 | 12/1992 |
| WO | WO 93/04473 | 3/1993 |
| WO | WO 93/08542 | 4/1993 |
| WO | WO 95/01058 | 1/1995 |
| WO | WO 95/04431 | 2/1995 |
| WO | WO 95/11567 | 4/1995 |
| WO | WO 95/18449 | 7/1995 |
| WO | WO 95/31069 | 11/1995 |
| WO | WO 95/32584 | 11/1995 |
| WO | WO 95/32585 | 11/1995 |
| WO | WO 95/32587 | 11/1995 |
| WO | WO 96/09721 | 3/1996 |
| WO | WO 96/13932 | 5/1996 |
| WO | WO 96/25821 | 8/1996 |
| WO | WO 96/27982 | 9/1996 |
| WO | WO 96/33572 | 10/1996 |
| WO | WO 96/34491 | 10/1996 |
| WO | WO 96/36172 | 11/1996 |
| WO | WO 96/41472 | 12/1996 |
| WO | WO 96/41478 | 12/1996 |
| WO | WO 97/13368 | 4/1997 |
| WO | WO 97/31479 | 8/1997 |
| WO | WO 97/32434 | 9/1997 |
| WO | WO 97/34413 | 9/1997 |
| WO | WO 97/34414 | 9/1997 |
| WO | WO 97/40623 | 10/1997 |
| WO | WO 97/42763 | 11/1997 |
| WO | WO 97/46016 | 12/1997 |
| WO | WO 97/46943 | 12/1997 |

(56) References Cited

FOREIGN PATENT DOCUMENTS

| WO | WO 97/47124 | 12/1997 |
|----|----|----|
| WO | WO 97/48228 | 12/1997 |
| WO | WO 97/48230 | 12/1997 |
| WO | WO 97/49237 | 12/1997 |
| WO | WO 97/49242 | 12/1997 |
| WO | WO 98/01995 | 1/1998 |
| WO | WO 98/06219 | 2/1998 |
| WO | WO 98/07277 | 2/1998 |
| WO | WO 98/10589 | 3/1998 |
| WO | WO 98/12872 | 3/1998 |
| WO | WO 98/16056 | 4/1998 |
| WO | WO 98/17064 | 4/1998 |
| WO | WO 98/26594 | 6/1998 |
| WO | WO 98/26596 | 6/1998 |
| WO | WO 98/38831 | 9/1998 |
| WO | WO 98/39893 | 9/1998 |
| WO | WO 98/47279 | 10/1998 |
| WO | WO 98/47283 | 10/1998 |
| WO | WO 98/47287 | 10/1998 |
| WO | WO 98/47289 | 10/1998 |
| WO | WO 99/03267 | 1/1999 |
| WO | WO 99/60790 | 11/1999 |
| WO | WO 00/16548 | 3/2000 |

OTHER PUBLICATIONS

U.S. Appl. No. 11/267,200, filed Nov. 4, 2005, Craner.
The New York Times, "2 Makers Plan Introductions of Digital VCR" by John Markoff, Mar. 29, 1999.
Hofmann, Neumann, Oberlies, and Schadwinkel, "Videotext Programmiert Videorecorder," Rundfunktechnische Mitteilungen, Nov.-Dec. 1982, pp. 254-257 (translation attached).
"Electronic Programme Guide (EPG); Protocol for a TV Guide using electronic data Transmission" by European Telecommunication Standards Institute, May 1997, Valbonne, France, publication No. ETS 300 707.
"Windows 98 Feature Combines TV, Terminal and the Internet," New York Times, Aug. 18, 1998.
"Digital Video Broadcasting (DVB); DVB specification for data broadcasting", European Telecommunications Standards Institute, Draft EN 301 192 V1.2.1 (Jan. 1999).
Rewind, replay and unwind with new high-tech TV devices, by Lawrence J. Magid, *LA Times*. This document was printed from the Internet on Jun. 6, 1999 and bears a date of May 19, 1999.
Inside I-Guide User's Manual (Aug. 24, 2004).
http://www.iapplianceweb.com/story/OEG20040510N0003BC.htm (May 11, 2004).
TivoToGo (printed Mar. 8, 2006).

* cited by examiner

SYSTEMS AND METHODS FOR RECORDING PROGRAMS WITH A NETWORK RECORDING DEVICE UPON FAILURE OF A USER'S EQUIPMENT

BACKGROUND OF THE INVENTION

This invention is directed to systems and methods for performing recordings with a network recording device when a user's equipment fails.

Recording devices, such as digital video recording (DVR) devices, are well known in the art. DVR devices use one or more hard drives to record programs that have been selected for recording. Such devices, however, can fail due to, for example, hard drive over-heating, software bugs, hardware component malfunction, power failure, or any other source of failure of the device. If the DVR device (or other equipment controlling the DVR device) fails during, prior or after to the transmission time of a program selected for recording, the DVR device will not perform the recording in its entirety for the user. If the selected program is not transmitted again in the near future, the user is left with no easy means of acquiring a copy of the program.

Accordingly, it would be desirable to provide digital recording systems and methods for performing recordings with a network recording device when a user's equipment fails.

SUMMARY OF THE INVENTION

This and other objects of the present invention are accomplished in accordance with the principles of the present invention by providing systems and methods for performing recordings with a network recording device when a user's equipment fails.

The user's equipment includes an interactive television application, such as an interactive program guide. The interactive television application performs recordings with a recording device, also included in the user's equipment. When the user's equipment fails, a network recording device determines that the user's equipment cannot perform one or more recordings and, in response, performs the one or more recordings on behalf of the user's equipment.

In some embodiments, the interactive television application may anticipate that the user's equipment will fail (e.g., that the hard drive of the DVR is overheating and will shut down). In response to the anticipation, the interactive television application may send the network recording device an indication of one or more recordings that were scheduled to be performed during the anticipated failure, as well as instructions to perform the one or more recordings on behalf of the user's equipment.

Once the failure of the user's equipment has been corrected, the network recording device may transfer the recordings it performed to the user's equipment. This may be conditioned on, for example, whether the user's equipment has sufficient resources (e.g., enough space and/or an available tuner) to record the programs transmitted from the network recording device. Alternatively, the network recording device may provide the recordings to the user's equipment as on-demand offerings.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

Figure 1:
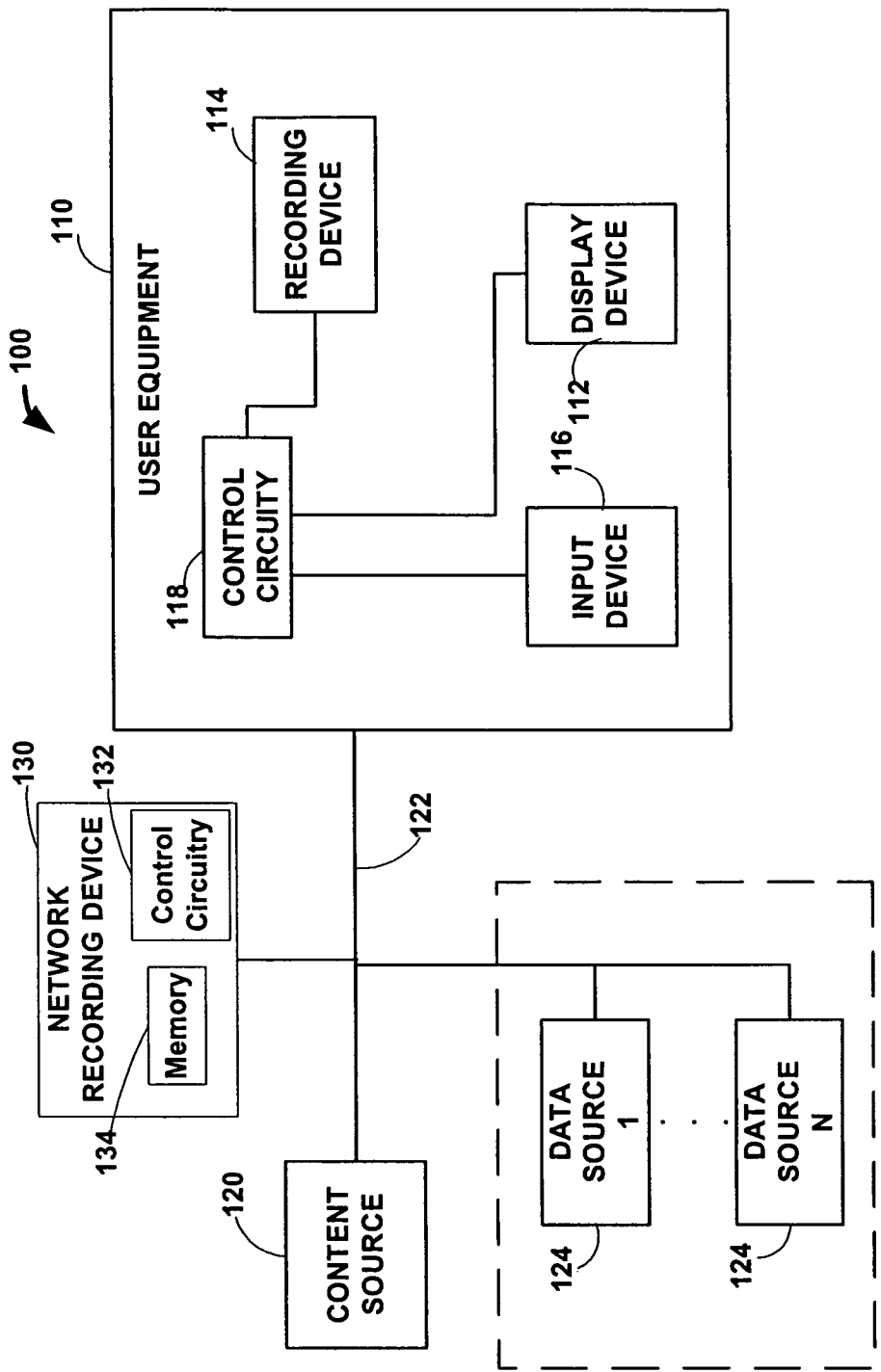
FIG. 1 is a diagram of an illustrative interactive television system in accordance with one embodiment of the present invention.

FIG. 1 shows illustrative interactive television system 100 in accordance with one embodiment of the invention. User equipment 110 receives content in the form of signals from content source 120 over communications path 122. In practice there may be multiple content sources 120 and user equipment 110, but only one of each has been shown in FIG. 1 to avoid over-complicating the drawing.

Content source 120 may be any suitable content source such as, for example, a cable system headend, satellite television distribution facility, television broadcast facility, on-demand server (e.g., VOD server), or any other suitable facility or system for originating or distributing content. Content source 120 may be configured to transmit signals over any suitable communications path 122 including, for example, a satellite path, a fiber-optic path, a cable path, or any other suitable wired or wireless path. The signals may carry any suitable content such as, for example, television programs, games, music, news, web services, or any other suitable content.

User equipment 110 may include any equipment suitable for providing an interactive television experience. User equipment 110 may include television equipment such as a television, set-top box, recording device, video player, user input device (e.g., remote control, keyboard, mouse, touch pad, touch screen and voice recognition interface) or any other device suitable for providing an interactive television experience. For example, user equipment 110 may include a DCT 2000, 2500, 5100, 6208 or 6412 set-top box provided by Motorola, Inc. In some embodiments, user equipment 110 may include computer equipment, such as a personal computer with a television card (PCTV).

In the example of FIG. 1, user equipment 110 includes at least control circuitry 118, display device 112, recording device 114, and user input device 116, which may be implemented as separate devices or as a single device. An interactive television application, such as an interactive television program guide, may be implemented on user equipment 110 to display, on display device 112, the content transmitted by content source 120 over path 122 and to provide interactive television application features.

Recording device 114 may be a personal video recorder (PVR), digital video recorder (DVR), video cassette recorder (VCR), DVD-recorder, or any other suitable video recorder. Recording device 114 may include one or more tuners.

Display device 112 may be any suitable device such as, for example, a television monitor or a computer monitor. Display device 112 may also be configured to provide for the output of audio.

Control circuitry 118 is adapted to receive user inputs from input device 116 and execute the instructions of the interactive television application. Control circuitry 118 may include one or more tuners (e.g., analog or digital tuners), encoders and decoders, processors (e.g., Motorola 68000 family processors), memory (i.e., RAM and hard disks), communications circuitry (e.g., cable modem circuitry), input/output circuitry (e.g., graphics circuitry), connections to the various devices of user equipment 110, and any other suitable component for providing analog or digital television programming, program recording, and interactive television features. In some embodiments, control circuitry 118 may be included as part of one of the devices of user equipment 110 such as, for example, part of recording device 114, display 112, or any other device (e.g., a set-top box, television and video player).

Any suitable number of users may have equipment, such as user equipment 110, connected to content source 120 and data source 124. But for the clarity of the figure, the equipment of only a single user is shown. The equipment of the plurality of users may be connected to content source 120 and data source 124 using a cable television network or any other suitable means. In some embodiments, the equipment of the plurality of users may be connected to each other using any suitable means.

User equipment 110 may receive interactive television application data from one or more data sources 124. Data sources 124 may provide data for a particular type of content or for a particular application. For example, one data source 124 may provide data for non-on-demand assets (e.g., non-pay and pay-per-view television programs), and another may provide data for on-demand assets (e.g., VOD programs). Or, for example, a single data source may provide both of these types of data. For example, one data source 124 may provide data for an interactive television program guide. Another data source 124 may, for example, provide data for another interactive television application running on user equipment 110 (e.g., a home shopping application). In some embodiments, data sources 124 may provide data to the interactive television application using a client/server approach. There may be one server per data source, one for all sources or, in some embodiments, a single server may communicate as a proxy between user equipment 110 and various data sources 124.

FIG. 1 shows content source 120 and data sources 124 as separate elements. In practice, their functionality may be combined and provided from a single system at a single facility, or multiple systems at multiple facilities. For example, one content source 120 and data source 124 may be combined to provide VOD content and associated VOD data.

Illustrative interactive television system 100 includes network recording device 130. Network recording device 130 may be any suitable type of recording device including, for example, a PVR, DVR, VCR, DVD-recorder, hard-drive arrays, a server, or any other suitable video recorder. Network recording device 130 includes control circuitry 132 and memory 134 for executing, for example, recording operations. Control circuitry 132 may include one or more tuners, processors, communications circuitry, I/O circuitry connected to the various devices of interactive television system 100, or any other suitable component. In some embodiments, control circuitry 132 may direct tuners to tune to channels carrying programs requested for recording by other devices of interactive television system 100 (e.g., by user equipment 110) and record the programs in memory 134. In some embodiments, network recording device 130 has direct access to programs (e.g., via and internet protocol (e.g., file transfer protocol) connection to program content source 120). Memory 134 may be one or more of RAM, ROM, hard disks, or any other suitable memory. In the example of FIG. 1, memory 134 is shown as a component of network recording device 130, but in other embodiments, memory 134 may be a stand-alone component. In some embodiments, control circuitry 132 may store in memory 134 information related to recorded programs such as, for example, recording options, recording attributes, deleting options, instructions from devices of interactive television system 100 or any other suitable information.

In some embodiments, control circuitry 132 may receive instructions from the interactive television application or from content source 120. The instructions may include, for example, instructions to record programs, delete programs, transfer recorded programs, generate a stream to transmit programs (e.g., as a VOD offering), modify the deleting priorities or programs, or any other suitable instruction.

In some embodiments, network recording device 130 may be incorporated in content source 120 (e.g., at the head-end of a cable plant), data source 124, a VOD server (not shown), user equipment 110 (e.g., as a second recording device, or a hard drive on a home computer), an Internet server, or any other suitable device. In some embodiments, network recording device 130 may be a stand alone device (e.g., a commercial network recording device, or a DVR device in a home or neighborhood network).

Figure 2:
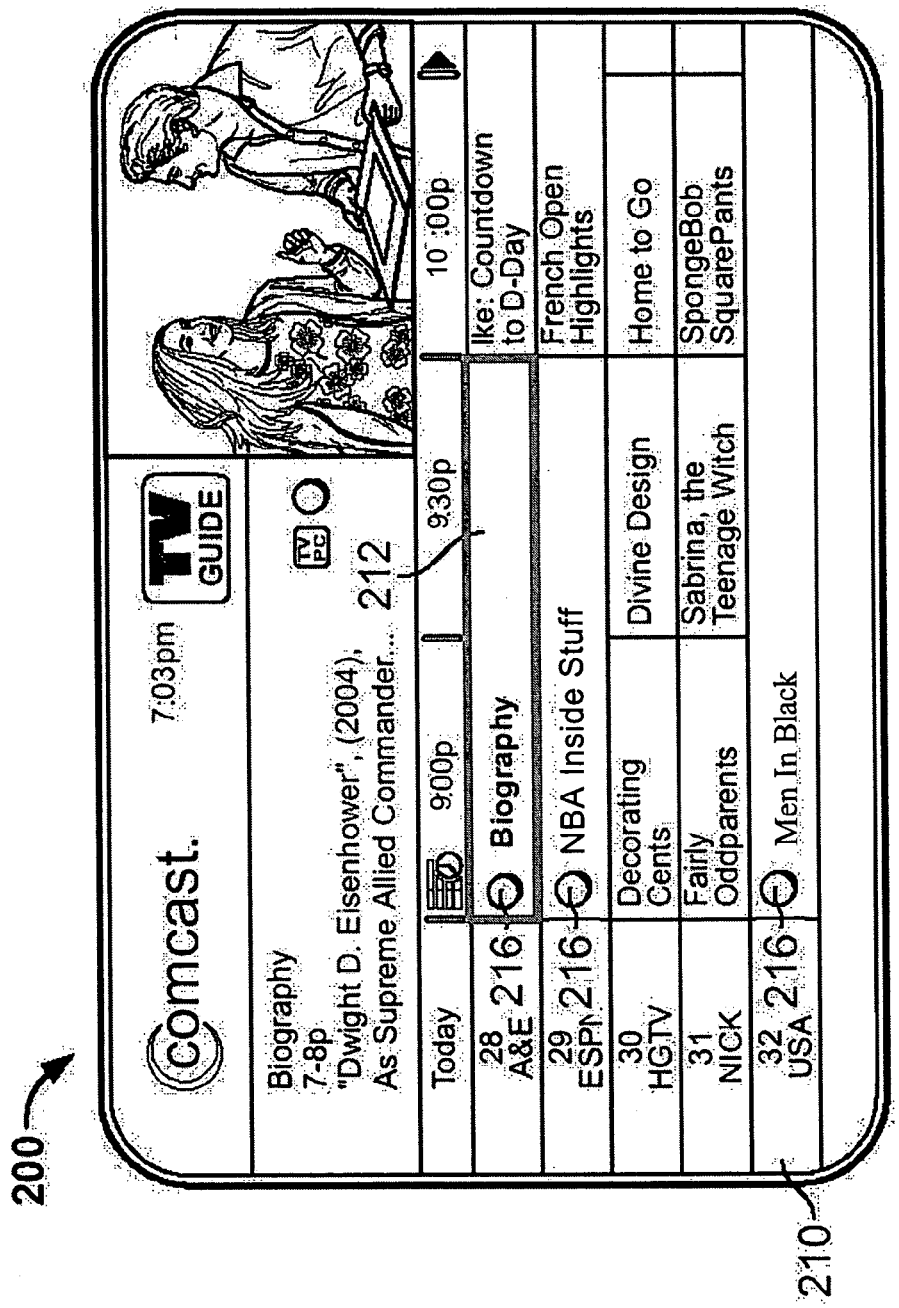
FIG. 2 shows an illustrative display screen showing television listings in accordance with one embodiment of the present invention.

FIG. 2 shows illustrative program guide screen 200 that may be displayed on display 112. The user may access program guide screen 200 by any suitable means such as, for example, pressing a "menu," "guide," or other suitable key or key sequence on user input device 116, navigating from another program guide screen or menu, or by any other means known in the art. Illustrative program guide screen 200 contains a grid of program listings 210, which includes program titles, channels and scheduled broadcast times. The screen may include any other suitable program information. In other embodiments, the program guide screen may include a list (i.e., a single column) of programs. The user may select a desired program listing with highlight region 212 using user input 116, or any other suitable means.

To schedule a program or other suitable video for recording, a user may highlight a desired program, as shown in FIG. 2 where "Biography" on channel 28 is highlighted, and press a "Record" key or key sequence, or select a "Record" option from the screen using user input device 116. Any suitable device from user equipment 110, for example recording device 114, may record the program. In response to receiving an instruction to record the program, the interactive television application may place icon 216 on the listing associated with the selected program to indicate to the user that the interactive television application has scheduled the program for recording (e.g., in FIG. 2, Biography, NBA Inside Stuff and Men In Black are scheduled for recording).

Figure 3:
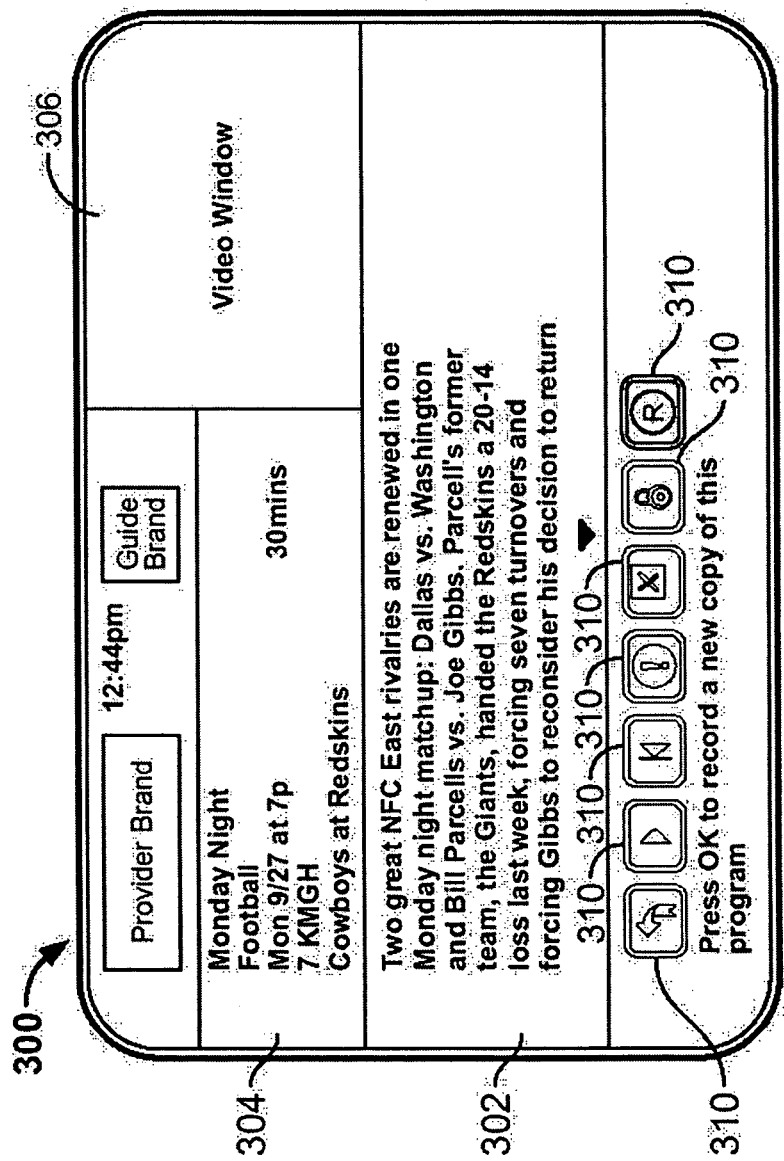
FIG. 3 shows an illustrative display screen showing information relating to a television program in accordance with one embodiment of the present invention.

Prior to choosing to record a program, the user may request additional information regarding the program. For example, the user may highlight a listing using highlight region 212 and press an "Information" key or key sequence on user input device 116. In response to receiving the user request, the interactive television application may display an information screen. FIG. 3 shows illustrative information screen 300, which includes detailed information section 302, program description area 304 (including the program title, time and channel), and video window 306. Screen 300 also includes selectable icons 310, some or all of which may include text descriptions. The screen may include options for recording, series recording, parental lock, or any other suitable interactive television application action. If a user determines that he wants to record the program, the user may schedule the recording by pressing a "Record" key or key sequence, selecting a "Record" option from the screen using a user input device (e.g., user input device 116), or by any other suitable means.

Figure 4:
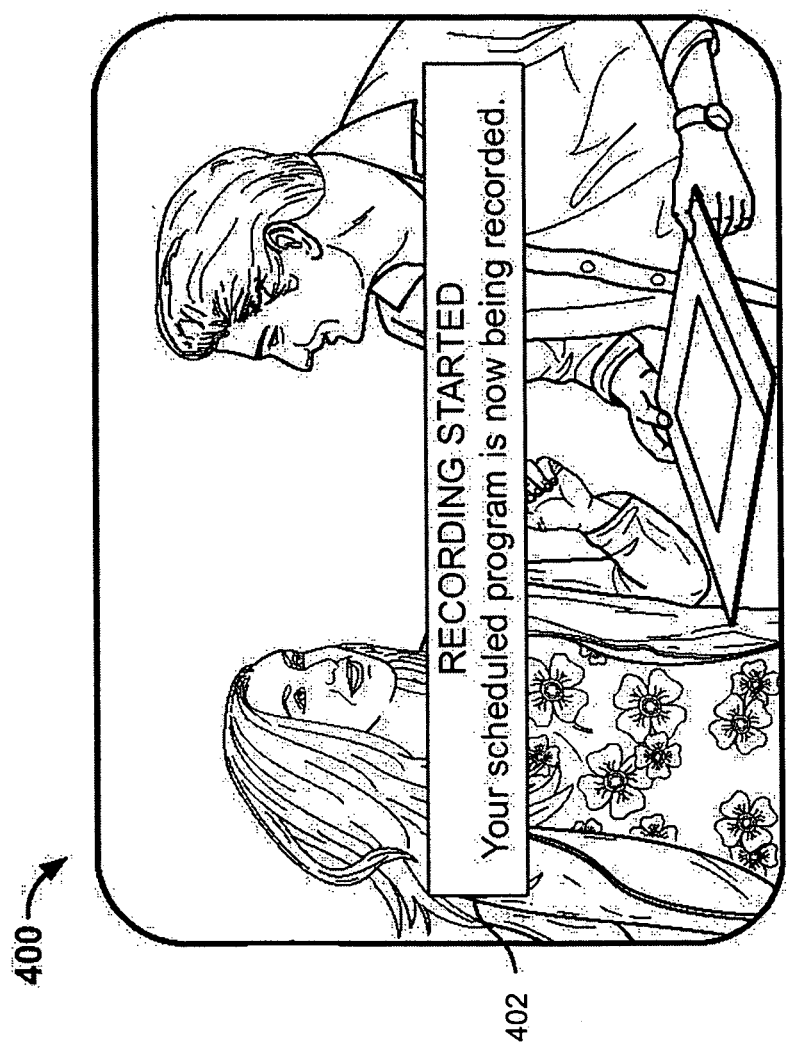
FIG. 4 shows an illustrative display screen showing a television program in full screen after a recording has commenced in accordance with one embodiment of the present invention.
Figure 5:
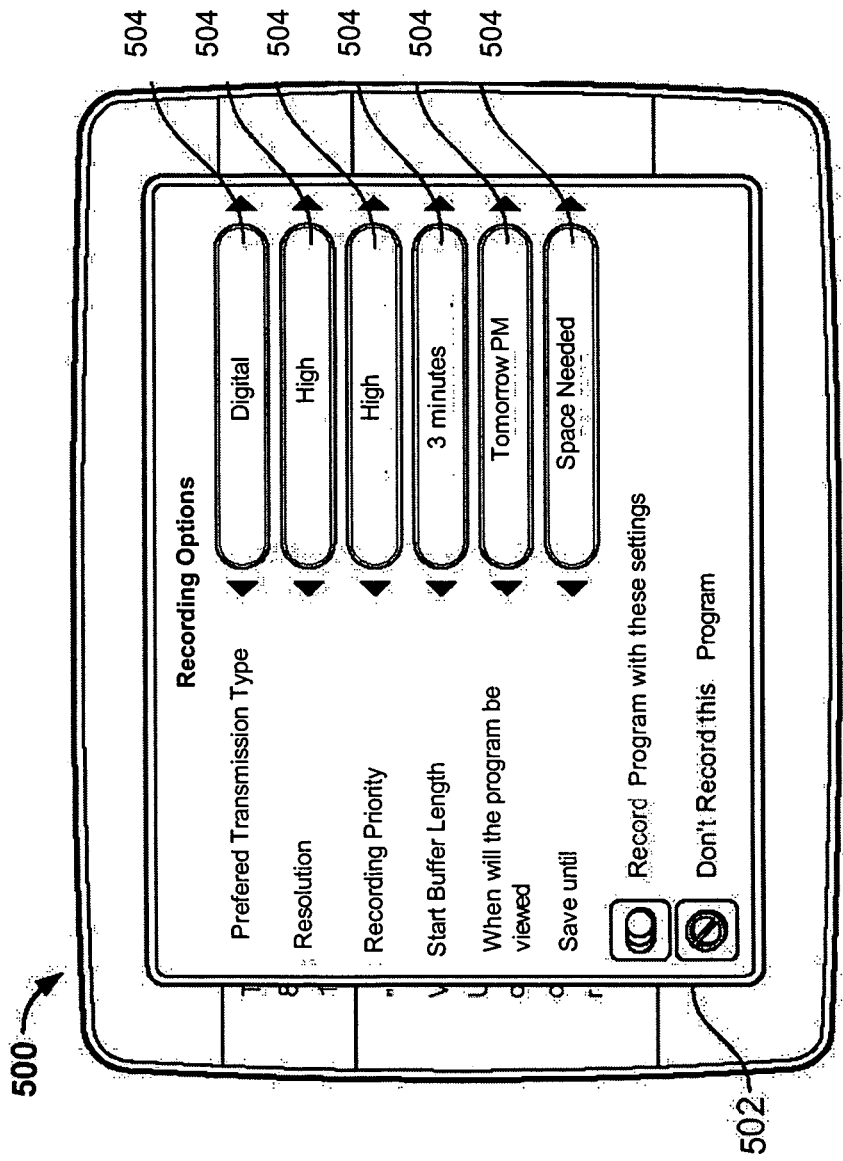
FIG. 5 shows an illustrative display screen showing recording options in accordance with one embodiment of the present invention.

The user may be watching a program on display device 112 in a full screen view, for example full screen view 400 shown in FIG. 4, and decide to record the program. To record the program, the user may press a "Record" key or key sequence on user input device 116, or use any other suitable means. A pop-up notice, such as pop-up notice 402, may appear to confirm that recording has begun. Such a notice may also appear in response to receiving a user confirmation to record the program (e.g., in response to a user confirming the recording with menu 502 of FIG. 5). In some embodiments, pop-up notice 402 may appear automatically when a previously-scheduled recording commences.

The interactive television application may prompt the user to set recording options for the program. For example, the interactive television application may display a screen or pop-up, such as recording options screen 500 shown in FIG. 5. Screen 500 includes recording options pop-up menu 502, which includes a plurality of recording options 504. Recording options 504 include the transmission type, resolution, recording priority, start buffer length, when the user intends on viewing the program, and how long to save the copy. In some embodiments, the recording options pop-up menu may include any other suitable recording option (e.g., end buffer length, how many copies to record, and/or which channel(s) to record). In some embodiments, the interactive television application may automatically set recording options for the program.

It may occur that the user's equipment fails prior to or during a recording, thus preventing the user from having a suitable copy of the recording. The user's equipment may fail in any number of ways including, for example, failing to perform the recording and performing a recording that the user cannot play back fully or at all. Causes of such a failure may include, for example, loss of power to the user's equipment, failure of communications between the interactive television application and the recording device (e.g., recording device 114), failure of communications between the interactive television application and the content source (e.g., unplugged coax cable), malfunction of the control circuitry (e.g., control circuitry 118 or the control circuitry of recording device 114, including the recording device's I/O circuitry), recording device failure (e.g., overheating of hard drive or losing the address where the program is stored), interactive television application or recording device software error, or any other such failure. As another example, the user's equipment may receive an emergency alert signal (EAS) signal and be forced to tune away from a recording, causing the recording to fail.

Any suitable device from interactive television system 100 may determine that the user's equipment has failed, or will fail, to perform a local recording. For example, a remote device such as content source 120 or network recording device 130 may determine that the user's equipment has failed. As still another example, a local device associated with user equipment 100 (e.g., control circuitry 118) may determine that it has failed. For clarity, however, the following discussion will focus on the cases where the network recording device (e.g., network recording device 130) or the user's equipment, upon determining that the user's equipment has failed, or will fail, to perform a local recording.

The network recording device (e.g., network recording device 130) may determine whether the user's equipment has failed using any suitable approach. In some embodiments, the network recording device may determine that the user's equipment has failed by an interruption or fault in communications from the user's equipment. For example, network recording device 130 may request a communication from user equipment 120 and not receive a response. As another example, network recording device 130 may not receive a communication from user equipment 120 at a predefined or predetermined time at which user equipment 120 was supposed to send a communication. A suitable predefined or predetermined time may include, for example, just prior to when the user's equipment should start to perform a recording or while a recording is performed. The communications may include, for example, a "heartbeat" or "keep alive" signal, a status report, a report of user equipment 120's activity, or any other suitable communication.

If the communications take the form of status reports, the status reports may include status information for some or every component of the user's equipment (e.g., recording device 114, control circuitry 118, and display device 112). To prepare the status report, control circuitry 118 may, for example, receive reports from some or every component of user equipment 120, combine the reports, and transmit the combined report to network recording device 130. As another example, the one or more components of user equipment 120 may each transmit individual status reports to network recording device 130.

In some embodiments, instead of the interactive television application automatically providing the network recording device with status reports, the network recording device may request status reports from the interactive television application at scheduled or pre-defined times (e.g., at regular intervals or before the interactive television application is to start a recording).

In some embodiments, the user's equipment may anticipate a failure that will prevent it from performing one or more recordings. For example, the interactive television application may monitor the temperature of the recording device to determine whether the hard drive of the recording device will overheat. In some embodiments, a remote device (e.g., network recording device 130) may monitor the user's equipment and anticipate a failure (e.g., by remotely monitoring the temperature of the hard drive of recording device 114)

When the user's equipment anticipates a failure, it may send a communication to the network recording device to indicate the anticipated failure. Alternatively, if a remote device anticipates the failure, the remote device may send a communication to the user's equipment to inform it of the anticipated failure. The user's equipment may provide communications to the network recording device instructing it to perform one or more recordings that the user's equipment cannot perform because of the failure. The communication may identify which recordings to perform (e.g., based on how long the failure is expected to last, or recordings scheduled to be performed within a given time) and how to perform them (e.g., with what recording options). In some embodiments, the user's equipment may identify, either automatically or in response to a user instruction, only some of the initiated or scheduled recordings using any suitable criteria (e.g., recording options or recording theme).

When the user's equipment fails (e.g., a hard drive fails), but its communications circuitry (e.g., control circuitry 118) remains operational, the user's equipment may send a communication to the network recording device to indicate the failure. The user's equipment may also request that the network recording device perform recordings initiated or scheduled by the user's equipment that the user's equipment cannot perform, and identify such recordings and their associated recording options in the communication. The user's equipment may identify recordings scheduled to be performed within any suitable time (e.g., based on how long the failure is expected to last, or recordings scheduled to be performed within a given time). In some embodiments, the user's equipment may identify, either automatically or in response to a user instruction, only some of the initiated or scheduled recordings using any suitable criteria (e.g., recording options, priorities, cost of storage or recording theme). In response to the communication, the network recording device (e.g., network recording device 130) may perform the requested recordings.

When the user's equipment fails in such a way that communications are not possible with the network recording device, the network recording device must determine which programs to record. To identify the programs, prior to the failure, the user's equipment may send a communication to the network recording device indicating each recording that is initiated or scheduled by the user's equipment. The communication may include the recording options set for each recording. The user's equipment may send the communication to the network recording device at any suitable time such as, for example, when a recording is first initiated or scheduled, just prior to when a recording is to begin, during a recording, at regular intervals (e.g., every hour, every evening or every week), or at any other suitable time. When the user modifies the recording options or cancels a recording, the user's equipment may include the changes in its communication with the network recording device. Thus, when the network recording device determines that the user's equipment has failed, the network recording device already knows which recordings to perform for the user's equipment.

When the user's equipment fails after recordings have been performed in such a way that recordings are lost, the user's equipment may retrieve the recordings from other devices of interactive television system 100. One approach is for the network recording device (e.g., network recording device 130) to automatically record every recording that is initiated or scheduled by the user's equipment. The network recording device may conserve space for recording new programs by automatically deleting recordings based on any suitable priority scheme (e.g., deleting programs that the user has viewed or deleting programs with certain recording options).

In some embodiments, the interactive television application may direct the network recording device to perform failed recordings only when certain criteria are met. The criteria may include, for example, recording options (e.g., a recording priority), program attributes (e.g., a theme, an actor or the program is part of a series), or any other suitable criteria. In some embodiments, when the network recording device does not have sufficient resources to perform all of the failed recordings, the network recording device may perform only the recordings that satisfy certain criteria. To reduce the volume of communication between the user's equipment and the network recording device, the user's equipment may communicate to the network recording device only the recordings that satisfy the criteria.

The network recording device may hold the recordings that it performs for any suitable length of time. For example, the network recording device may hold recordings for a fixed time period (e.g., one week, one month), as long as the network recording device does not need the space to perform new recordings, until the user plays back the recording, or until the user's equipment instructs it to delete the recording. The network recording device (e.g., network recording device 130) may indicate that a recording is to be held by, for example, modifying an entry in memory 134 that is associated with the recording using control circuitry 132 to set the deleting priority of the recording to "do not delete", "no flush," or "save."

In some cases, the network recording device may have already performed (e.g., on behalf of another user or in response to a previous instruction to perform the recording) a recording identified by the user's equipment. Rather than re-performing the recording, the network recording device may hold the recording for the user's equipment. For example, control circuitry 132 may modify an entry in memory 134 that is associated with the recording and set the deleting priority of the recording to "do not delete," "do not flush," or "save."

The network recording device may determine that a failure of the user's equipment has been resolved in any suitable manner. In some embodiments, the network recording device may monitor its communications with the user's equipment. For example, the network recording device may periodically request status reports from the user's equipment, and determine that a failure has been resolved in response to receiving a status report that indicates that the user's equipment is operational. As another example, the network recording device may receive a communication automatically sent by the user's equipment that indicates that a failure has been resolved. In response to determining that the failure has been resolved, the network recording device may cancel recordings scheduled because of the user's equipment's failure and return the responsibility of performing the recordings to the user's equipment. The network recording device may, however, finish performing recordings that it has begun. In some embodiments, the network recording device may cancel the recordings only in response to an indication from the user's equipment that it will perform the recordings.

After a failure has been resolved and once the communications between the network recording device and the user's equipment have been reestablished, the network recording device may inform the user's equipment of the failure. This may be useful in cases where the user or the interactive television application did not know that the user's equipment failed to perform recordings.

Figure 6:
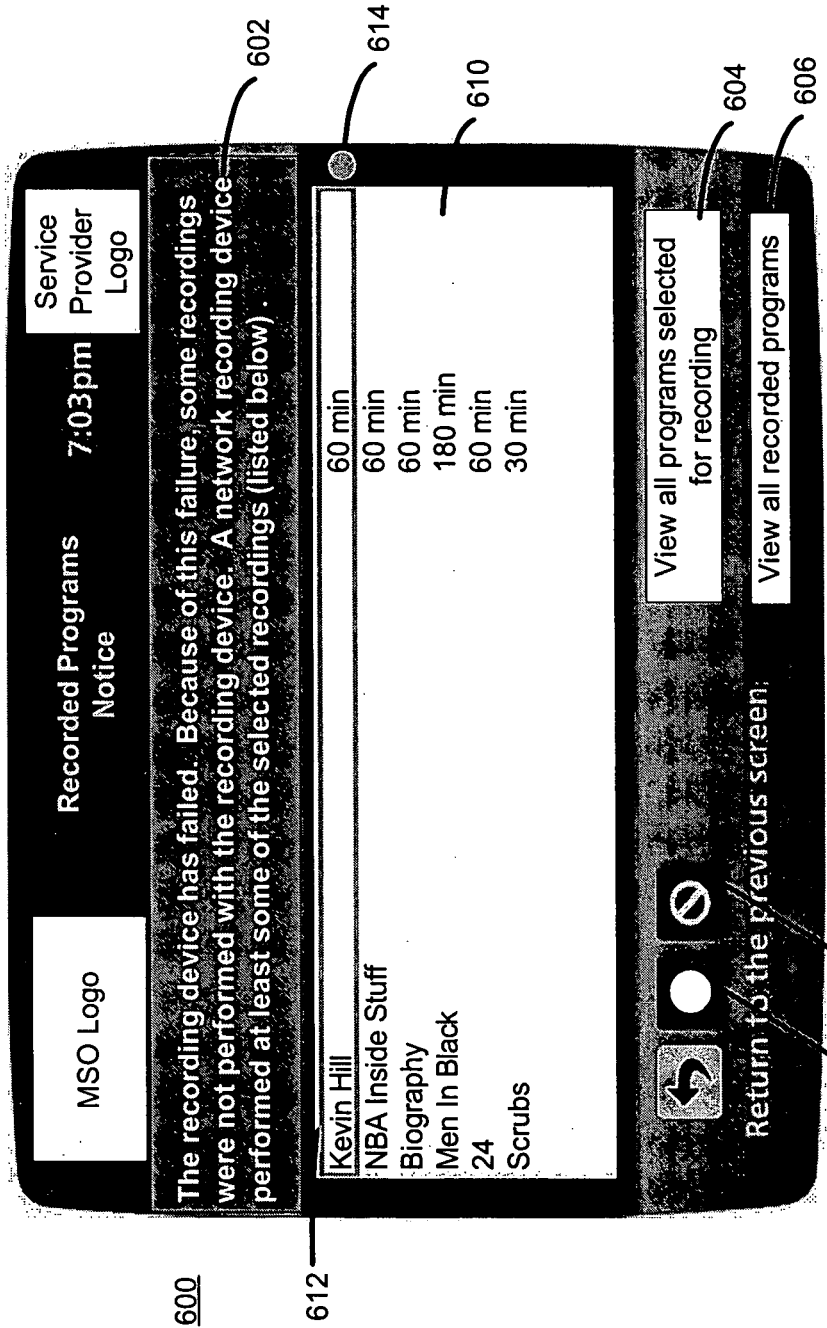
FIG. 6 shows an illustrative display screen showing an illustrative recorded programs notice of the user's equipment in accordance with one embodiment of the present invention.

In some embodiments, in response to determining that the user's equipment has failed (e.g., automatically, or in response to a notice from the network recording device), the interactive television application may display a failure notice to the user. FIG. 6 shows illustrative notice 600, which includes information section 602 that indicates to the user that the user's equipment has failed, and that some of the recordings originally initiated or scheduled for local recording were not performed with the user's equipment. Information section 602 also indicates that the network recording device performed at least some of the recordings that the user's equipment did not perform. In some embodiments, the information section may include the time and type of the failure. Notice 600 includes listings 610 of recordings performed by the network recording device. Listings 610 include program title and length. The listings may include any other suitable information.

The user may transfer a recording from the network recording device to the user's equipment by selecting the listing associated with the recording (e.g., using highlight region 612) and selecting a transfer option (e.g., icon 620). In some embodiments, the interactive television application may mark the listing of a recording that is selected for transferring to the user's equipment in any suitable manner including, for example, placing an icon besides the listing (e.g., icon 614), placing a colored border around the listing, changing the color of the listing, changing the font of the listing, or any other suitable manner. In some embodiments, the user may cancel transferring a recording by selecting the listing associated with the recording and selecting a cancel option (e.g., icon 622).

In cases where the network recording device did not perform all of the initiated or scheduled recordings while the user's equipment had failed, the user may select an option (e.g., icon 604) to view the recordings that were not performed with the network recording device. The user may select an option to view all of the recordings performed by both the user's equipment and the network recording device (e.g., icon 606).

Figure 7:
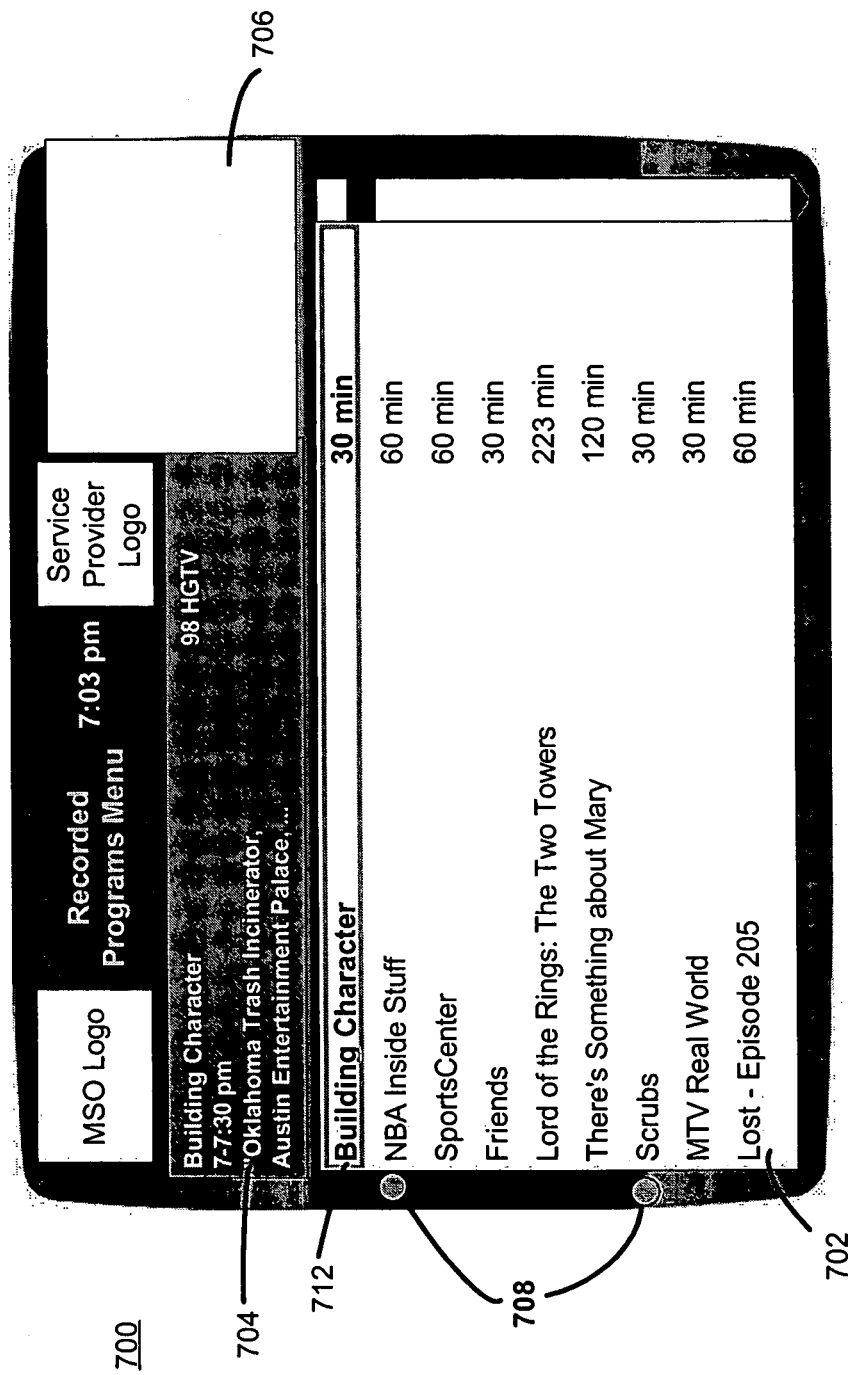
FIG. 7 shows an illustrative display screen showing recorded programs listings in accordance with one embodiment of the present invention.

In response to selecting the option to view all of the performed recordings (e.g., icon 606), the interactive television application may display a recorded programs menu. One such menu is illustrative recorded programs menu 700, shown in FIG. 7. In some embodiments, the interactive television application may provide a recorded program menu without first displaying a notice indicating that the user's equipment failed. For example, the user may access recorded programs menu 700 by pressing a "Recorded Programs Menu" key or key sequence, navigating from another interactive television application screen (e.g., selecting a "Recorded Programs Menu" option from an interactive television application screen using user input device 116), or by any other suitable means. Menu 700 includes recordings listings 702, detailed information section 704 and video window 706. Listings 702 include the program title and program length. The listings may include any other suitable information (e.g., channel number).

The listings may include both recordings performed with the user's equipment and recordings performed with the network recording device. In some embodiments, the interactive television application may differentiate the recordings performed with each recording device for the user. For example, the interactive television application may mark listings of recordings performed with one of the devices by placing an icon besides the listing (e.g., icon 708), placing a colored border around the listing, changing the color of the listing, changing the font of the listing, or by another suitable marking. In the example shown in FIG. 7, "NBA Inside Stuff" and "Scrubs" are identified by icon 708 as being recorded by the network recording device. As another example, the recorded programs menu may include different sets of listings for the recordings performed with each recording device. Alternatively, the interactive television application may not differentiate between the recordings performed with each device so as to keep the display as simple as possible for the user.

To play back a recording, the user may select the listing (e.g., using highlight region 712) associated with the recording from listings 702 and press a "play" key or key sequence on the user input device, select a play option from an interactive television application screen, or perform any other suitable step to initiate playback. If the selected recording was recorded by the user's equipment, the interactive television application may direct the user's equipment to play back the recording by, for example, directing the display device (e.g., display device 112) to display the selected recording.

If instead the selected recording was performed with the network recording device, the interactive television application may direct the network recording device to transmit the program to the user's equipment. For example, in response to a playback request, the network recording device may provide the recording to the user as a VOD offering (e.g., by generating and transmitting a video stream having the selected recording to the user's equipment). As another example, in response to the playback request, and provided the user's equipment has sufficient resources to store the recording (e.g., enough space and a tuner available for receiving the transmission), the network recorder may transfer the selected recording to the user's equipment. The user's equipment may play back the recording once the transfer is complete or while information is streaming to the user's equipment. The network recording device may delete a recording that has been transferred to the user's equipment to free resources.

Other uses for a combination of a network recording device and a user's equipment are described in commonly owned U.S. patent application Ser. No. 11/267,200, filed Nov. 4, 2005, entitled "SYSTEMS AND METHODS FOR RECORDING PROGRAMS USING A NETWORK RECORDING DEVICE AS SUPPLEMENTAL STORAGE," and incorporated herein in its entirety.

Figure 8:
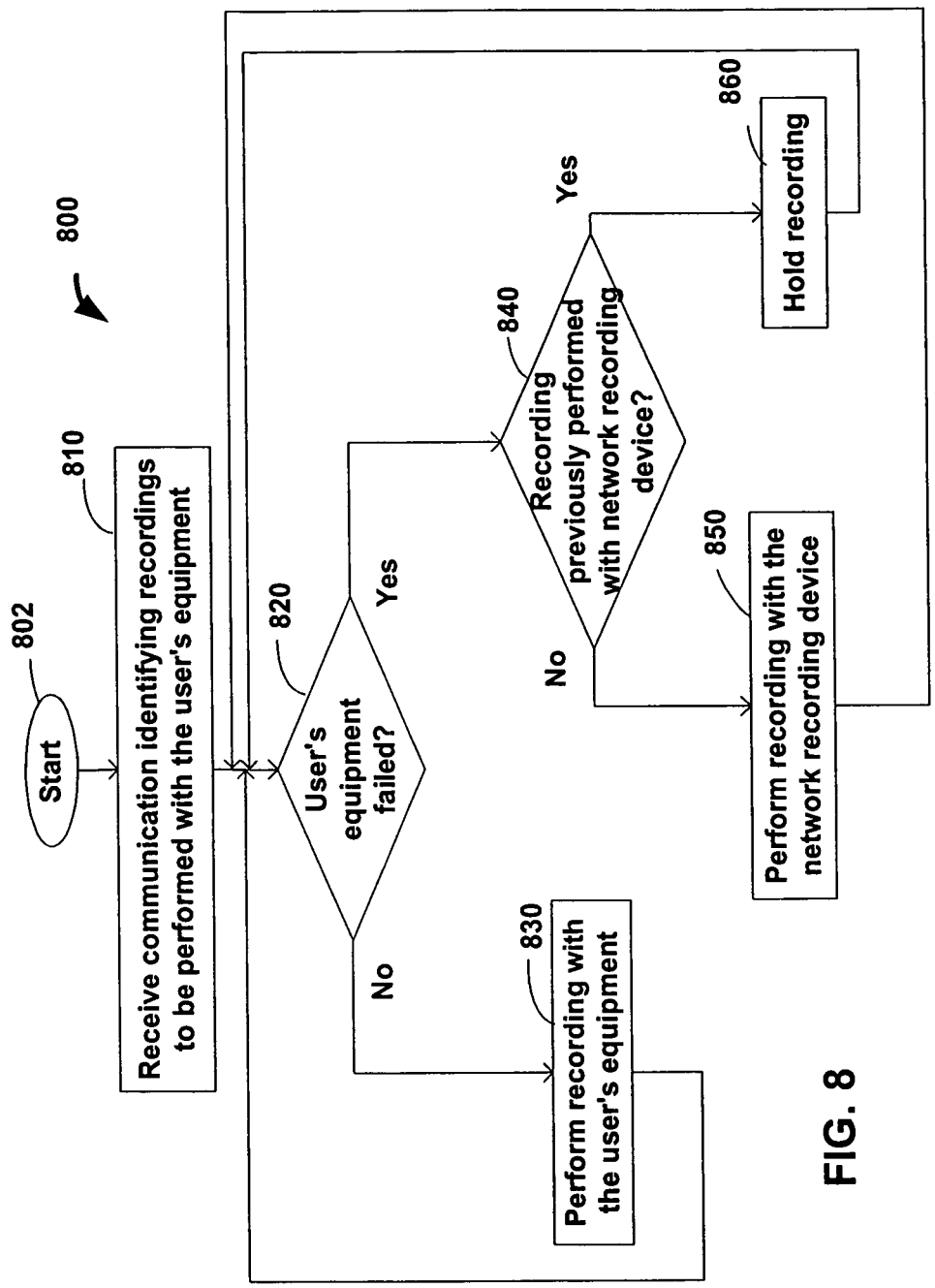
FIG. 8 shows a flow chart of an illustrative process for performing recordings using a network recording device when the user's equipment fails in accordance with one embodiment of the present invention.

The following flow charts serve to illustrate processes involved in some embodiments of this invention. FIG. 8 is a flow chart of an illustrative process for recording programs using a network recording device when the recording device of the user's equipment fails. Process 800 begins at step 802. At step 810, network recording device 130 (FIG. 1) receives a communication from user equipment 110 that identifies recordings initiated or scheduled to be performed with user equipment 110. For example, every time the interactive television application schedules or initiates a new recording, user equipment 110 may send a communication to network recording device 130 to indicate the new recording. The communication may include the recording options set for the recording. It should be understood that network recording device 130 may be replaced by content source 120 or any other device of interactive television system 100 in any of the processes discussed below.

At step 820, network recording device 130 determines whether user equipment 110 has failed. Network recording device 130 may determine whether user equipment 110 has failed at any suitable time including, for example, at regular intervals, just prior to a recording beginning, during a recording (in which case a partial recording can be done by the network recording device and potentially combined with the pre-failure potion that was already recorded), or at any other suitable time. Network recording device 130 may determine whether user equipment 110 has failed in any suitable manner including, for example, requesting a communication from user equipment 110 and not receiving one.

If network recording device 130 determines that user equipment 110 has not failed, process 800 moves to step 830. At step 830, user equipment 820 performs recordings initiated or scheduled to be performed with user equipment 110 (e.g., recordings communicated at step 810). Process 800 then loops back to step 820 to determine whether, now at a later time, user equipment 110 has failed and is able to continue to perform recordings. Process 800 loops as long as user equipment 110 has recordings to perform.

If instead network recording device 130 determines that user equipment 110 has failed, process 800 moves to step 840. At step 840, network recording device 130 determines whether it has already performed a recording initiated or scheduled to be performed with user equipment 110 (e.g., a recording communicated to network recording device 130 at step 810). If network recording device 130 determines that it has previously performed a recording, process 800 moves to step 850. At step 850, network recording device 130 holds the recording for user equipment 110 (e.g., set the deleting priority of the programs to "do not delete," "do not flush," or "save") rather than re-performing the same recording. Process 800 then, as in step 830, loops back to step 820 to determine whether, now at a later time, user equipment 110 has still failed or whether the failure has been resolved, and whether user equipment 110 can perform recordings again.

If instead network recording device 130 determines that it has not yet performed a recording, process 800 moves to step 860. At step 860, network recording device 130 performs the recording. Process 800 then, as in steps 830 and 850, loops back to step 820 to determine whether, now at a later time, user equipment 110 has still failed or whether the failure has been resolved, and whether user equipment 110 can perform recordings again.

Figure 9:
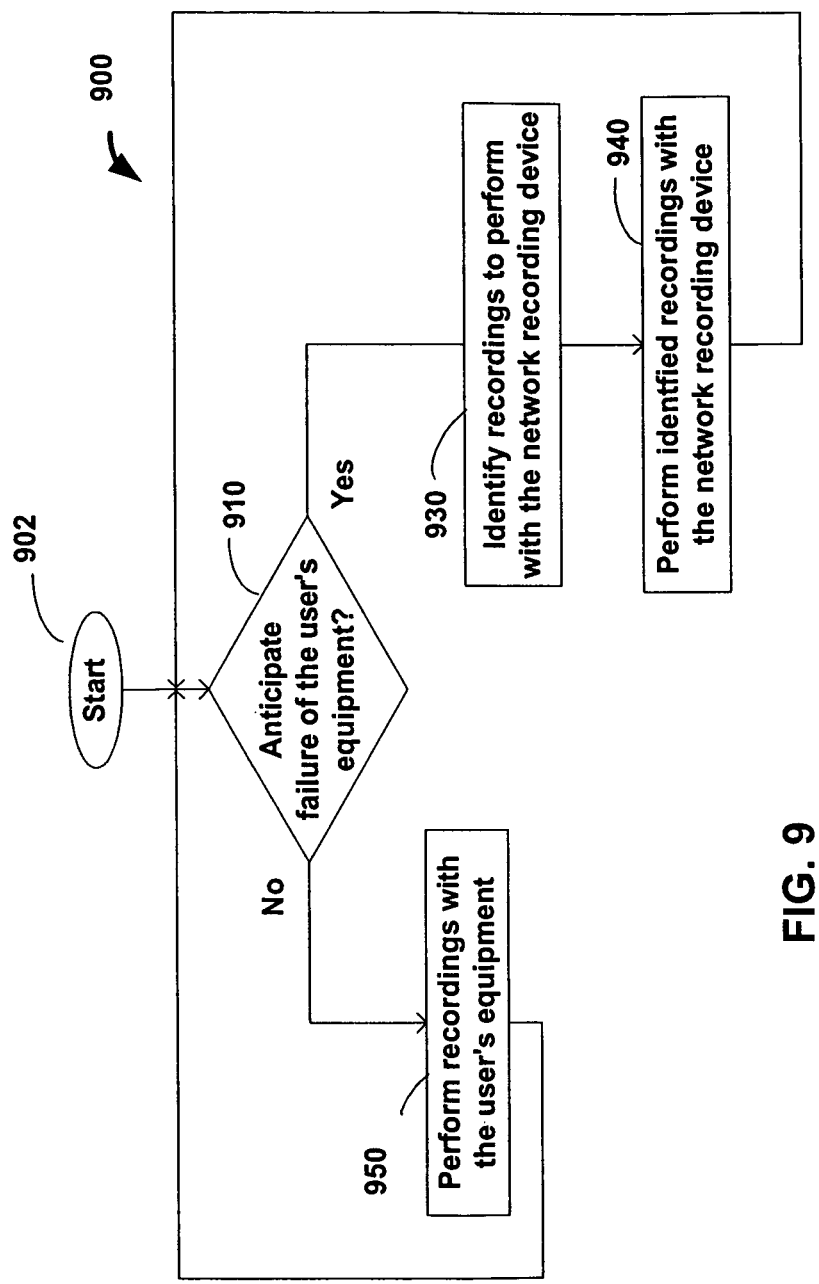
FIG. 9 shows a flow chart of an illustrative process for performing recordings when the user's equipment anticipates a failure in accordance with one embodiment of the present invention.

FIG. 9 is a flow chart of an illustrative process for performing recordings with a network recording device when the user's equipment anticipates a failure. Illustrative process 900 begins at step 902. At step 910, user equipment 110 (FIG. 1) determines whether it anticipates a failure of its recording capabilities. For example, the user equipment 110 may determine whether the hard drive of recording device 114 (FIG. 1) is overheating and will be shut down shortly to allow it to cool. If user equipment 110 anticipates that it will fail, process 900 moves to step 930.

At step 930, user equipment 110 identifies the recordings that were originally initiated or scheduled to be performed with user equipment 110, but that it will not be able to perform because of the anticipated failure. For example, user equipment 110 may identify all recordings that it was to perform in the next day, 2 days, or week. User equipment 110 may send network recording device 130 (FIG. 1) a communication identifying the recordings that user equipment 110 will not perform so that network recording device 130 can perform the recordings instead.

At step 940, user equipment 110 directs network recording device 130 to perform the recordings identified at step 930. For example, user equipment 110 may send network recording device 130 a communication with instructions to perform the recordings identified previously in another communication. Alternatively, user equipment 110 may identify which recordings to perform and direct network recording device 130 to perform the identified recordings in the same communication. If a recording has already been performed with network recording device 130, process 900 may skip step 940. Instead, network recording device 130 may hold the recording for user equipment 110 (e.g., set the deleting priority of the programs to "do not delete," "do not flush," or "save") rather than re-performing the same recording. Process 900 then moves back to step 910 to determine whether user equipment 110 anticipates a new failure. Process 900 ends when user equipment 110 has no recordings left to perform.

If instead, at step 910, user equipment 110 determines that it is not anticipating a failure, process 900 moves to step 950. At step 950, user equipment 110 performs the recordings that it were initiated or scheduled for it to perform. Process 900 then moves back to step 910 to determine if, now at a later time, user equipment 110 anticipates a failure.

In some embodiments, instead of determining whether user equipment 110 anticipates a failure (i.e., step 910), user equipment 110 may determine whether it has failed but managed to maintain a communications link with network recording device 130. For example, user equipment 110 may determine whether control circuitry 118, including its communications circuitry, is operational, and recording device 114 (FIG. 1) has failed. If user equipment 110 determines that it has not failed at all, process 900 moves to step 950. If user equipment 110 determines that it has failed and has maintained a communications link with network recording device 130, process 900 moves to step 920. If instead user equipment 110 determines that it has failed and has not maintained a communications link with network recording device 130, process 900 moves to step 840 of process 800.

Figure 10:
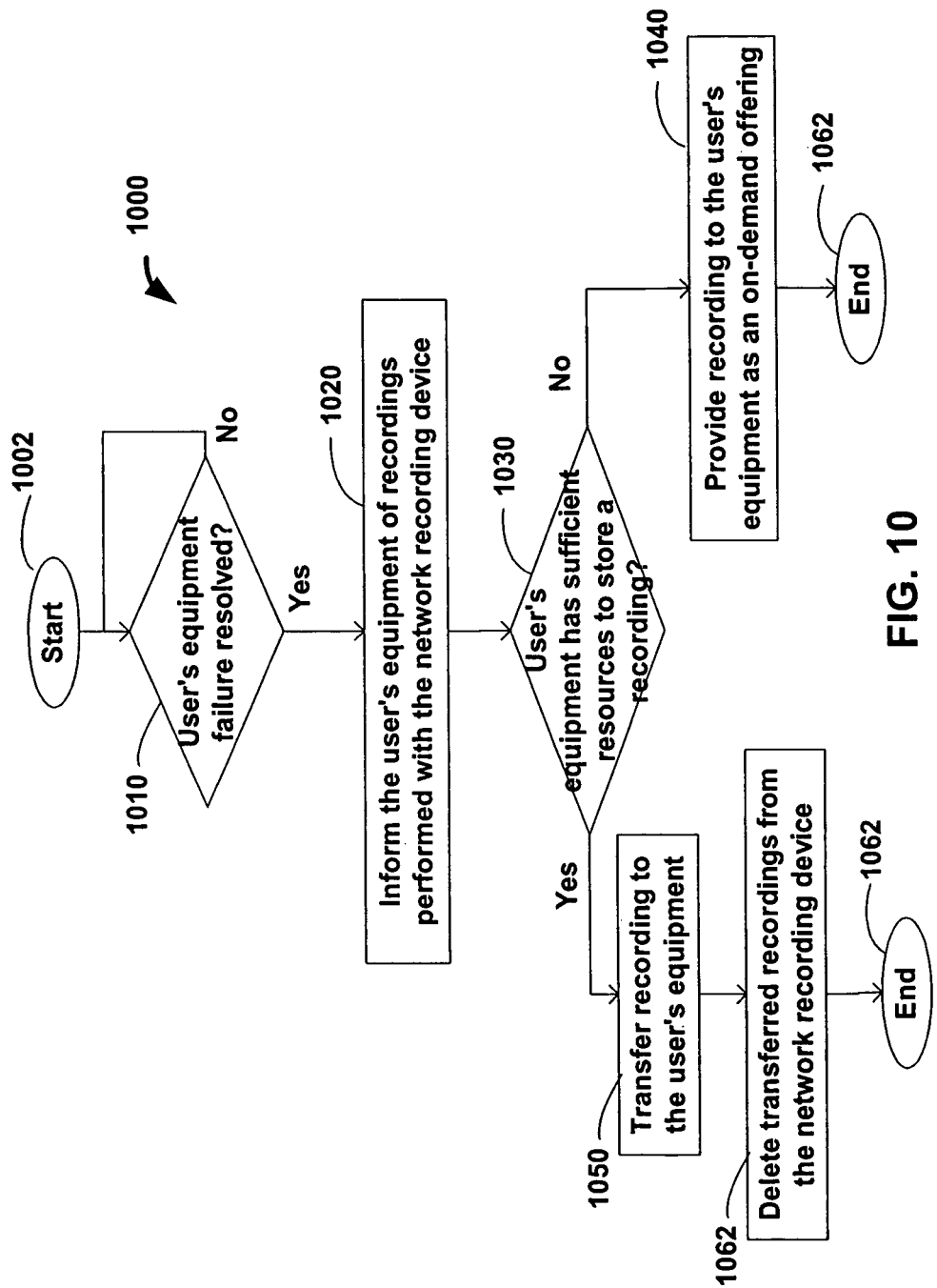
FIG. 10 shows a flow chart of an illustrative process for transferring recordings from the network recording device to the user's equipment in accordance with one embodiment of the present invention.

FIG. 10 is a flow chart of an illustrative process for transferring recordings from the network recording device to the user's equipment after a failure of the user's equipment has been resolved. Illustrative process 1000 begins at step 1002. At step 1010, network recording device 130 (FIG. 1) determines whether the failure of user equipment 110 (FIG. 1) has been resolved. Network recording device 130 may use any suitable approach to determine whether the failure has been resolved. For example, network recording device 130 may determine that a failure has been resolved by receiving a communication from user equipment 110 indicating that user equipment 110 is again capable of performing recordings. If network recording device 130 determines that user equipment 110 has not yet resolved the failure, process 1000 returns to step 1010.

If instead network recording device 130 determines that user equipment 110 has resolved the failure, process 1000 moves to step 1020. At step 1020, network recording device 130 sends a communication to user equipment 110 to inform it of the recordings that network recording device 130 performed while user equipment 110 had failed. In some cases, this communication may serve to indicate to user equipment 110 that it had failed.

At step 1030, user equipment 110 determines whether it has sufficient resources to store one or more recordings that were performed by network recording device 130. If user equipment 110 determines that it does not have sufficient resources to store one or more recordings, process 1000 moves to step 1040. At step 1040, network recording device 130 provides the recordings it performed to user equipment 110 as on-demand offerings. Process 1000 ends at step 1062.

If instead user equipment 110 determines that it has sufficient resources to store one or more recordings performed by network recording device 130, process 100 moves to step 1050. At step 1050, network recording device 130 transfers one or more recordings to user equipment 110. User equipment 110 stores the received recordings, for example with recording device 114 (FIG. 1). At step 1060, network recording device 130 deletes its copies of the recordings that were transferred. In some embodiments, network recording device 130 may provide recordings to user equipment 110 as on-demand offerings even if user equipment 110 has sufficient space to store the recordings. This may be useful when, for example, user equipment 110 is saving sufficient space for performing a future recording. Process 1000 ends at step 1062.

The above described embodiments of the present invention are presented for purposes of illustration and not of limitation, and the present invention is limited only by the claims which follow.

What is claimed is:

1. A method for performing a recording with a network recording device when a user's equipment is unable to perform any recording, the method comprising:
   determining that a resource of the user's equipment is or will be unable to perform any recording; and
   in response to determining that the resource of the user's equipment is or will be unable to perform any recording, performing the recording with the network recording device, wherein the network recording device is connected to a plurality of user equipment for performing recordings when at least one of the plurality of user equipment is or will be unable to perform any recording.

2. The method of claim 1 further comprising:
   receiving from the user's equipment, prior to determining that the user's equipment is or will be unable to perform any recording, a communication identifying recordings to be performed with the user's equipment; and
   wherein performing the recording with the network recording device comprises performing at least one of the identified recordings with the network recording device.

3. The method of claim 1 wherein performing the recording with the network recording device comprises holding onto a recording that the network recording device has previously performed.

4. The method of claim 1 wherein determining that the user's equipment will be unable to perform any recording comprises anticipating that the user's equipment will be unable to perform any recording.

5. The method of claim 4 further comprising:
   receiving from the user's equipment, in response to anticipating that the user's equipment will be unable to perform any recording, a communication identifying recordings to perform with the network recording device; and
   wherein performing the recording with the network recording device comprises performing at least one of the identified recordings with the network recording device.

6. The method of claim 1 further comprising providing the recording performed with the network recording device to the user's equipment.

7. The method of claim 6 wherein providing the recording performed with the network recording device to the user's equipment comprises providing the recording to the user's equipment as a video on-demand (VOD) offering.

8. The method of claim 6 further comprising:
   receiving an indication from the user's equipment that it has sufficient resources to store a recording performed with the network recording device; and
   wherein providing the recording performed with the network recording device to the user's equipment comprises, in response to receiving the indication from the user's equipment, transferring the recording from the network recording device to the user's equipment.

9. The method of claim 1 further comprising:
   receiving an indication from the user's equipment that the inability to perform any recording has been resolved; and
   in response to receiving the indication, providing the user's equipment with a list of recordings performed with the network recording device.

10. The method of claim 1 further comprising:
    receiving an indication from the user's equipment that the inability to perform any recording has been resolved;
    in response to receiving the indication, canceling recordings scheduled to be performed with the network recording device; and
    directing the user's equipment to perform the canceled recordings.

11. The method of claim 1 wherein the user's equipment is located at the user's site.

12. The method of claim 1, wherein:
    the user's equipment device outputs to a display screen; and
    the determination of whether the resource of the user's equipment is or will be unable to perform any recording is performed without accessing the network;
    further comprising in response to the determination, transmitting a communication over the network to instruct the network recording device to perform the recording.

13. A method for performing recordings using a user's equipment and a network recording device comprising:
    determining that a resource of the user's equipment is or will be unable to perform any recording;
    in response to determining that the resource of the user's equipment is or will be unable to perform any recording, sending a communication, while the user's equipment can still send communications, to the network recording device identifying recordings to perform with the network recording device, wherein the network recording device is connected to a plurality of user equipment for performing recordings when at least one of the plurality of user equipment is or will be unable to perform any recording; and
    directing the network recording device to perform at least one of the recordings identified in the communication.

14. The method of claim 13 wherein determining that the user's equipment is or will be unable to perform any recording comprises anticipating that the user's equipment will be unable to perform any recording.

15. The method of claim 13 wherein determining that the user's equipment is or will be unable to perform any recording comprises determining that the user's equipment is unable to perform any recording and can still communicate with the network recording device.

16. The method of claim 13, wherein:
    the user's equipment device outputs to a display screen;
    the determination of whether the resource of the user's equipment is or will be unable to perform any recording is performed without accessing the network; and
    the communication sent to the network recording device is sent over the network.

17. A system for performing a recording with a network recording device when a user's equipment is unable to perform any recording, the network recording device comprising control circuitry configured to:
    determine that a resource of the user's equipment is or will be unable to perform any recording; and
    in response to determining that the resource of the user's equipment is or will be unable to perform any recording, direct the network recording device to perform the recording, wherein the network recording device is connected to a plurality of user equipment for performing recordings when at least one of the plurality of user equipment is or will be unable to perform any recording.

18. The system of claim 17 wherein the control circuitry is further configured to:
  receive from the user's equipment, prior to determining that the user's equipment is unable to perform any recording, a communication identifying recordings to be performed with the user's equipment; and
  direct the network recording device to perform at least one of the identified recordings.

19. The system of claim 17 wherein the control circuitry is further configured to direct the network recording device to hold onto a recording that it has previously performed.

20. The system of claim 17 wherein the control circuitry is further configured to anticipate that the user's equipment will be unable to perform any recording.

21. The system of claim 20 wherein the control circuitry is further configured to:
  receive from the user's equipment, in response to anticipating that the user's equipment will be unable to perform any recording, a communication identifying recordings to perform with the network recording device; and
  direct the network recording device to perform at least one of the identified recordings.

22. The system of claim 17 wherein the control circuitry is further configured to provide the recording performed with the network recording device to the user's equipment.

23. The system of claim 22 wherein the control circuitry is further configured to provide the recording to the user's equipment as a video on-demand (VOD) offering.

24. The system of claim 22 wherein the control circuitry is further configured to:
  receive an indication from the user's equipment that it has sufficient resources to store a recording performed with the network recording device; and
  direct the network recording device to transfer the recording from the network recording device to the user's equipment.

25. The system of claim 17 wherein the control circuitry is further configured to:
  receive an indication from the user's equipment that the inability to perform any recording has been resolved; and
  provide the user's equipment with a list of recordings performed with the network recording device.

26. The system of claim 17 wherein the control circuitry is further configured to:
  receive an indication from the user's equipment that the inability to perform any recording has been resolved;
  in response to receiving the indication, direct the network recording device to cancel recordings scheduled to be performed; and
  direct the user's equipment to perform the canceled recordings.

27. The system of claim 17, wherein:
  the user's equipment device outputs to a display screen; and
  the determination of whether the resource of the user's equipment is or will be unable to perform any recording is performed without accessing the network;
  the control circuitry is further configured to transmit, in response to the determination, a communication over the network to instruct the network recording device to perform the recording.

28. A system for performing a recording with a network recording device when a user's equipment is unable to perform any recording, the user's equipment comprising control circuitry configured to:
  determine that a resource of the user's equipment is or will be unable to perform any recording;
  in response to determining that the resource of the user's equipment is or will be unable to perform any recording, send a communication, while the user's equipment can still send communications, to the network recording device identifying recordings to perform with the network recording device, wherein the network recording device is connected to a plurality of user equipment for performing recordings when at least one of the plurality of user equipment is or will be unable to perform any recording; and
  direct the network recording device to perform the recordings identified in the communication.

29. The system of claim 28 wherein the control circuitry is further configured to anticipate that the user's equipment will be unable to perform any recording.

30. The system of claim 28 wherein the control circuitry is further configured to determine that the user's equipment is unable to perform any recording and can still communicate with the network recording device.

31. The system of claim 28, wherein:
  the user's equipment device outputs to a display screen;
  the determination of whether the resource of the user's equipment is or will be unable to perform any recording is performed without accessing the network; and
  the communication sent to the network recording device is sent over the network.

* * * * *